US009115737B2

(12) United States Patent
Huttenlocher

(10) Patent No.: US 9,115,737 B2
(45) Date of Patent: Aug. 25, 2015

(54) RADIATOR GRILLE FOR A MOTOR VEHICLE

(75) Inventor: Marc Huttenlocher, Nürtingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 230 days.

(21) Appl. No.: 13/884,260

(22) PCT Filed: Nov. 8, 2011

(86) PCT No.: PCT/DE2011/001947
§ 371 (c)(1),
(2), (4) Date: May 8, 2013

(87) PCT Pub. No.: WO2012/062280
PCT Pub. Date: May 18, 2012

(65) Prior Publication Data
US 2013/0221707 A1    Aug. 29, 2013

(30) Foreign Application Priority Data

Nov. 8, 2010   (DE) .......................... 10 2010 050 515

(51) Int. Cl.
*B60R 19/52*   (2006.01)
*F16B 5/00*    (2006.01)
*F16B 5/02*    (2006.01)
*B60K 11/08*   (2006.01)
*F16B 21/09*   (2006.01)

(52) U.S. Cl.
CPC . *F16B 5/00* (2013.01); *B60R 19/52* (2013.01); *F16B 5/0225* (2013.01); *B60K 11/08* (2013.01); *B60R 2019/525* (2013.01); *F16B 21/09* (2013.01)

(58) Field of Classification Search
CPC .. B60K 11/08; B60R 19/52; B60R 2019/525; F16B 5/00; F16B 21/09; F16B 5/0225
USPC .............. 296/193.1, 187.09, 193.09; 293/115
See application file for complete search history.

(56) References Cited

U.S. PATENT DOCUMENTS

| 3,312,983 | A | * | 4/1967 | Jansson et al. ..................... 4/650 |
| 4,944,540 | A | * | 7/1990 | Mansoor et al. ............... 293/115 |
| 5,087,106 | A | * | 2/1992 | Betts ............................. 312/263 |
| 7,044,517 | B2 | * | 5/2006 | Hyuga ........................ 296/193.1 |
| 2010/0078149 | A1 | * | 4/2010 | Yoshimitsu et al. ............ 165/67 |

FOREIGN PATENT DOCUMENTS

| DE | 1950610 A1 | 4/1971 |
| DE | 10050419 A1 | 11/1992 |
| DE | 4238725 A1 | 5/1994 |
| DE | 19741062 A1 | 3/1999 |
| DE | 19741062 A1 * | 4/1999 |
| DE | 10210366 B3 | 1/2004 |
| DE | 10260392 A1 | 7/2004 |
| GB | 2242722 A | 10/1991 |

* cited by examiner

*Primary Examiner* — Jason S Morrow
*Assistant Examiner* — E Turner Hicks
(74) *Attorney, Agent, or Firm* — Jordan IP Law, LLC; Todd A. Vaughn

(57) ABSTRACT

Attachment part or trim part for vehicles are typically provided with a plurality of fastening points of which several are provided with through-holes for receiving aligning or fastening devices, in particular welded bolts, screws or rivets. Some of the fastening points are additionally designed to be movable in a premounted situation in a latching manner between a plurality of predetermined positions relative to the aligning or fastening devices used, in order to permit thereby an adjustment of the attachment part or trim part relative to the attachment point on a vehicle. In order to achieve the simplest possible design, it is proposed that the positions are predetermined by the internal contour of the through-holes.

18 Claims, 3 Drawing Sheets

RADIATOR GRILLE FOR A MOTOR VEHICLE

CROSS-REFERENCE TO RELATED APPLICATIONS

The present application is a National Stage Application of PCT International Application No. PCT/DE2011/001947 (filed on Nov. 8, 2011), under 35 U.S.C. §371, which claims priority to German Patent Application No. DE 10 2010 050 515.3 (filed on Nov. 8, 2010), which are each hereby incorporated by reference in their complete respective entireties.

TECHNICAL FIELD

The present invention relates to an attachment part and trim part for a vehicle and, in particular, a radiator grille for a motor vehicle having a plurality of fastening points which are provided with through-holes for receiving aligning or fastening means and are movable in a latching manner between a plurality of positions relative to the aligning or fastening means used, in order to permit an adjustment of the vehicle trim part relative to the attachment point on the vehicle. The present invention also relates to a method for mounting such an attachment part and trim part.

BACKGROUND

Attachment parts and trim parts for vehicles and, in particular, the front radiator grille of a motor vehicle are generally fastened by means of a plurality of fastening elements to components fixed to the bodywork. Said components are, for example, the engine hood, a bodywork component configured as a crossmember or a fender. When mounting the radiator grille, a very accurate alignment or adjustment is undertaken before fastening in the final position. Thus a uniform gap size from the adjacent trim parts is achieved, irrespective of the tolerances of the components. This uniform gap size is regarded by the end user as a measure of the perceived value of the motor vehicle.

A very simple, cost-effective and rapid fastening of such attachment parts and trim parts is achieved by clip connections. Clips, however, require a positive fastening situation and generally do not permit an alignment of the components relative to one another. An alignment or adjustment is possible, for example, with screws and slots. However, locating and maintaining the position until the permanent connection is produced after tightening the screw relies on the skill of the factory worker.

Some improvement is achieved in this case by the adjustable fastening means for attaching a radiator grille disclosed in the official document DE 42 38 725 A1. As the adjustment is carried out by rotating an eccentric body, the locating of an accurate position is facilitated. Additionally, the loss of alignment by inadvertent movement of the components relative to one another, until the permanent connection is produced, is to a certain extent reliably excluded.

During the alignment or adjustment of the radiator grille, however, it is necessary to actuate the eccentric body by any mechanical means. The eccentric body is thus not able to be arranged at a position which is inaccessible during the positioning. This in turn restricts the installation situation. As in a typical case the positioning of the radiator grille is one of the last steps when mounting the vehicle front part, there is a very limited applicability for this known solution.

SUMMARY

In a first feature, the object of the present invention is to develop an attachment part and trim part for a vehicle and, in particular, a radiator grille for a motor vehicle such that simplified mounting is possible and thus the appearance of the join is improved in the mounted state.

In a second feature, the object of the present invention is to provide a particularly simple and reliable method for mounting an attachment part and trim part for a vehicle and, in particular, a radiator grille on a motor vehicle.

The object is achieved in a first feature by an attachment part and trim part for a vehicle having, for example, the following features: a plurality of fastening points provided with through-holes for receiving aligning or fastening means, such as, in particular, welded bolts, screws or rivets, and are designed to be movably held in a premounted situation in a latching manner between a plurality of predetermined positions relative to the aligning or fastening means used, in order to permit an adjustment of the attachment part or trim part relative to the attachment point on the vehicle, such that the positions are predetermined by the internal contour of the through-holes.

The object is achieved in the second feature by a method having, for example, the following steps: attaching a vehicle trim part with a plurality of fastening points to aligning or fastening means configured or premounted on the vehicle side, in a latched arrangement with limited mobility; aligning the vehicle trim part between the latched positions; and fixing the vehicle trim part by additional fastening means in the region of the fastening points.

By means of the embodiment in accordance with the invention of the attachment part and trim part, accurate gap dimensions may be achieved with a short mounting time. The advantage is substantially such that the alignment of the attachment part and trim part does not have to be carried out at the same time as the final fixing thereof. In particular, for a typical radiator grille there is the advantage that the alignment thereof with regard to the visible gap is possible when the engine compartment cover is closed, even when the final fixing is only possible when the engine compartment cover is open. Hitherto, in order to avoid additional retaining devices it was necessary to provide the insertion of fastening screws, clips or rivets through the openings of the radiator grille. Now, the choice of position of the attachment points of the radiator grille on the vehicle body no longer have to be dependent on this secondary condition.

In the method for mounting in accordance with the invention, in a first step the vehicle trim part and the component fixed to the vehicle may be brought into a latched arrangement with limited mobility. Subsequently, an accurate alignment of the components in the x-direction may take place by simple displacement of the aligning means between the latching positions. A subsequent fixing of the vehicle trim part is possible by an additional fastening means.

Further advantageous embodiments and developments of the vehicle trim part in accordance with the invention are revealed from the sub-claims.

DRAWINGS

Various preferred embodiments of the attachment part and trim part for a vehicle are described hereinafter by way of example, wherein for the purposes of illustration reference is made to the accompanying schematic drawings, in which.

DESCRIPTION

Figure 1:
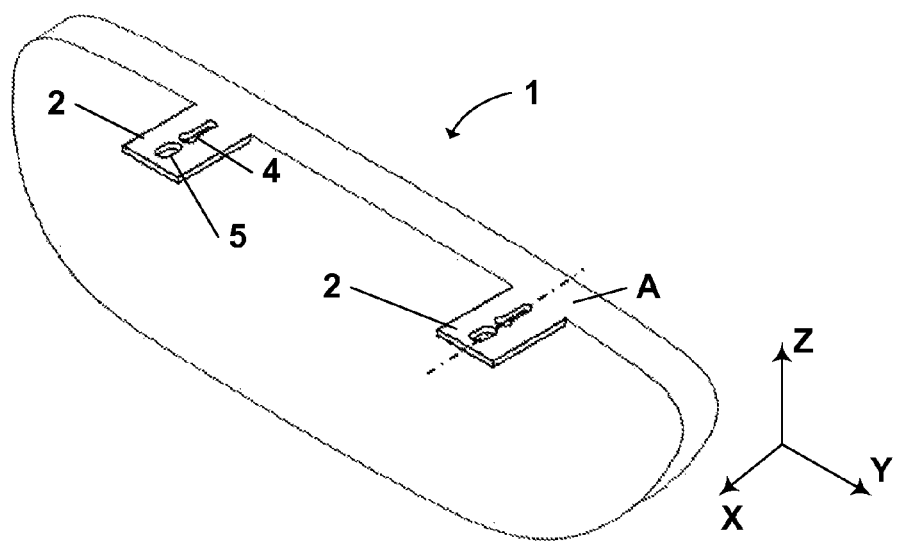
FIG. 1 illustrates a schematic perspective view of a first preferred embodiment of an attachment part and trim part for a vehicle in the form of a typical radiator grille, in accordance with the invention.
Figure 2:
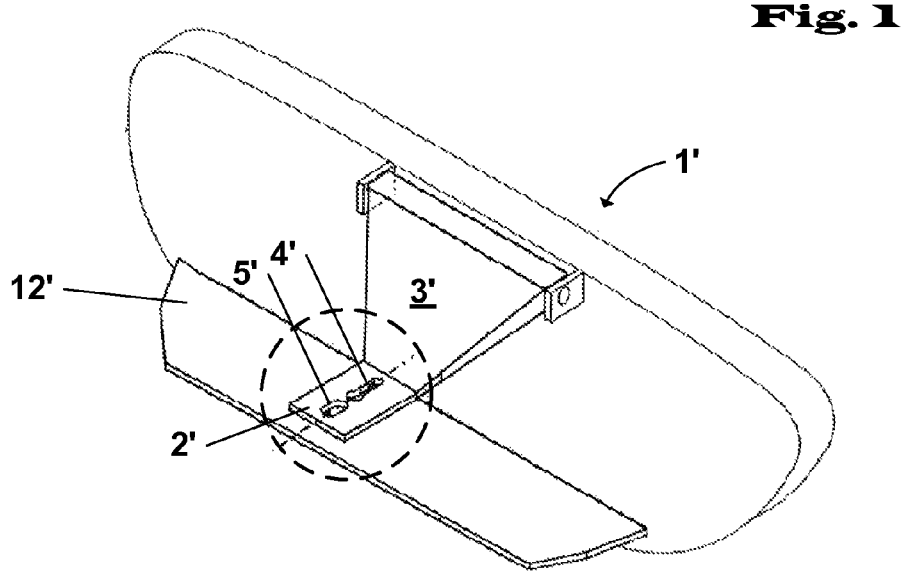
FIG. 2 illustrates a perspective view of a second preferred embodiment of an attachment part and trim part for a vehicle, in accordance with the invention.

FIGS. 1 and 2 illustrate schematic perspective views of two different radiator grilles 1, 1' which are described hereinafter in more detail as a first preferred embodiment and as a second preferred embodiment of an attachment part and trim part for a vehicle. Both radiator grilles 1, 1' are provided at approximately the same position for fitting to the structure of a motor vehicle front part.

The first radiator grille 1 illustrated schematically in FIG. 1 has two fastening points 2 for securing to the attachment points on the motor vehicle, and which are designed as preferably integrally formed rectangular tabs on one upper edge. In accordance with the coordinate system indicated schematically to the right in FIG. 1, the z-direction in the present case coincides with the vertical axis of the vehicle which, with the y-axis, approximately spans the plane of the main direction of extension of the radiator grille 1, 1'. The fastening points 2 protrude from said main plane of the main direction of extension in an approximately negative x-direction and thus to the rear. Naturally, in the case of an approximately planar radiator grille 1, the described situation represents a considerable simplification as regards typical currently applicable products. The simplification which has been implemented, however, facilitates the understanding of related solutions which are based thereon without undue effort and which are able to be extended to typical product designs and installation situations.

The second preferred embodiment illustrated schematically in FIG. 2 is a radiator grille 1' which, instead of fixed struts or the like, has an extension arm 3 pivotably fastened to the upper edge. At the protruding end thereof, the fastening point 2' is in turn configured as a rectangular tab with an elongate through-hole 7. By means of the extension arm 3 fastened in an articulated manner, the introduction of buckling forces is avoided in the transition to the body of the radiator grille V. For supporting in the vertical direction, i.e., in the direction of the z-axis, a projection extending in the horizontal plane is rigidly arranged below the extension arm 3 on the second radiator grille V.

Figure 3:
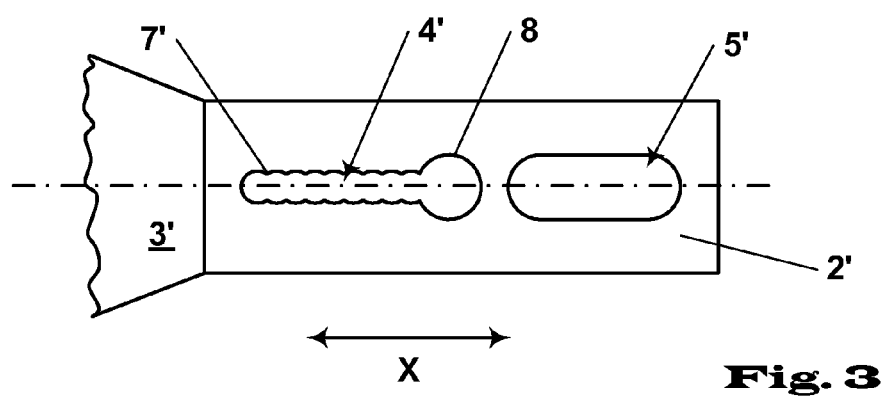
FIG. 3 illustrates a detailed view of the detail A of the schematic view in accordance with FIG. 1.

Details of the fastening points 2, 2', which are structurally identical in both embodiments, may be identified in the schematic detailed view in FIG. 3. Here it is illustrated, in particular, that the fastening point 2 designed as a rectangular tab in its main direction of extension preferably has through-holes 4, 5 aligned one behind the other. Said main direction of extension as already explained coincides with the x-direction of the usual coordinate system in accordance with FIG. 1 and is indicated in the drawings by a double arrow. Moreover, it may be seen in the detailed view that the first through-hole 5 is designed as a slot. Said slot serves for receiving a fastening means 6 which in the simplest case may be a cylindrical screw or a rivet. The second through-hole 7 is designed as an elongate opening 4 extending approximately in a linear manner with a toothed internal contour on both sides. Said through-hole 7 is provided to receive an aligning means, not illustrated in the drawings, which in the simplest case may be a welded stud or stud rivet.

The internal contour of the through-hole 7 in a first portion is an elongate opening 4, the shape thereof being reminiscent of a row of adjacent, overlapping round bores. Said elongate opening 7 opens on one side into a preferably cylindrical through-bore 8 which clearly visibly has a greater diameter relative to the clear width of the adjacent gap and the overlapping bores. As a result, the fastening point 2 may be pushed over the top of the aligning means already premounted on the vehicle side, which simplifies the mounting. The factory worker does not have to fetch the aligning means and mount said aligning means on the vehicle structure before mounting the radiator grille 1.

The aligning means in the described embodiment merely serves for cooperation with the internal contour of the through-hole when preparing the relative latching of the two components in a plurality of different positions and is not used for fastening in a specific position. Instead, the fastening points 2 are clamped non-positively together by a screw extending in the slot 5. Thus it is clear that the displacement path provided in the elongate opening of the through-hole 4 also has to be present in the slot 5.

Figure 4:
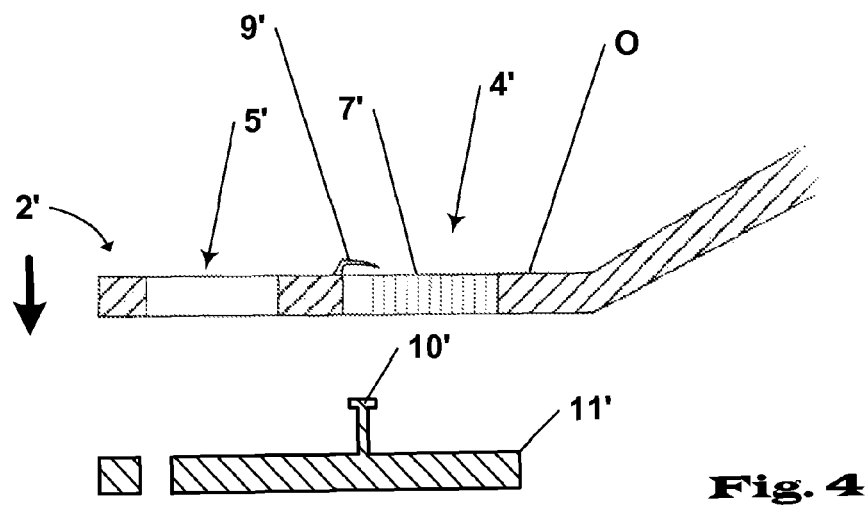
FIG. 4 illustrates a sectional view of a fastening point in the second preferred embodiment in accordance with FIG. 2.

In accordance with FIG. 4, moreover, for simplifying the mounting, a locking means 9' which is preferably designed as a resilient tongue is assigned to the second through-hole 7'. Said resilient tongue protrudes upwards from the upper face O of the fastening point 2 on the edge of the opening which is larger on one side. The selected description of the upper face O corresponds to the typical situation in which it is the side remote from the attachment point 9 on the vehicle. The tongue extends from the edge of the opening 8' slightly in the plane of the fastening point 2' toward the center thereof. The function of the locking means 9' is described in connection with the mounting method.

Figure 7:
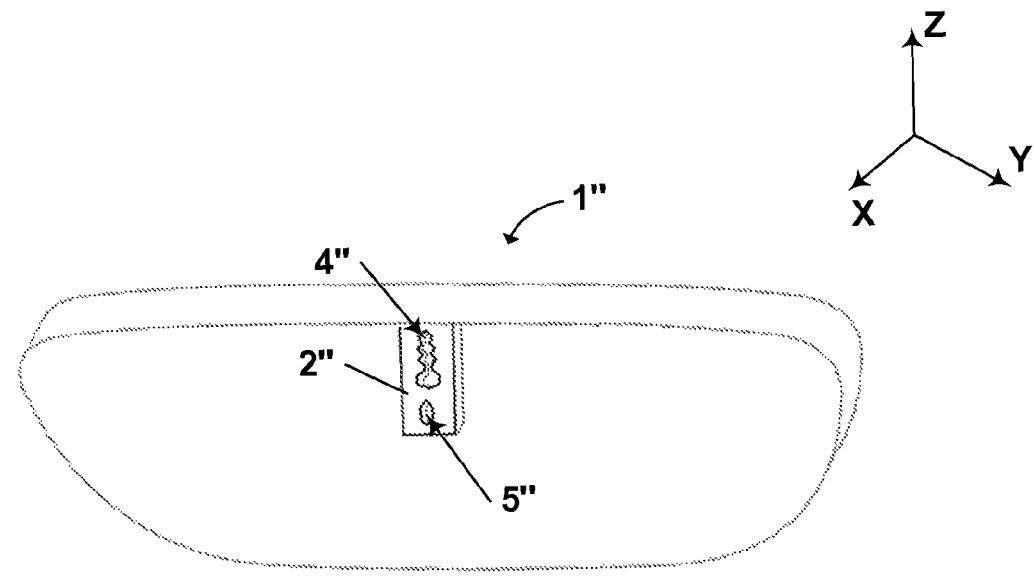
FIG. 7 illustrates a schematic perspective view of a third preferred embodiment of an attachment part and trim part for a vehicle, in accordance with the invention.
Figure 8:
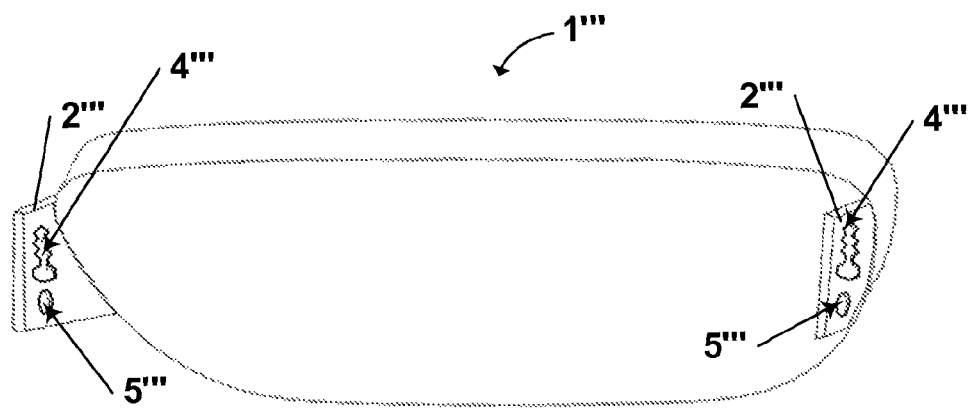
FIG. 8 illustrates a schematic perspective view of a fourth preferred embodiment of an attachment part and trim part for a vehicle, in accordance with the invention.

FIGS. 7 and 8 show further preferred embodiments of the present invention in which, in turn, the typical design of a simplified radiator grille may be identified. The fastening points 2", 2''' correspond structurally to those of the first preferred embodiment described in the introduction in accordance with FIG. 1, but are arranged for adjustment in the vertical direction, i.e., the z-direction. In the third preferred embodiment 1" in accordance with FIG. 7, only one fastening point 2" is provided centrally on the upper edge. Said fastening point could be configured in advantageous circumstances on a radiator grille so that the fastening means may be inserted from the front through the openings and is accessible. Nevertheless, the possibility of aligning or adjusting the radiator grille 1' to the latching premounted fastening before inserting the fastening means should also generally simplify the situation for the factory worker. This possibility could not arise in a typical installation situation with the fourth preferred embodiment 1'''. Here the fastening points 2''' are located approximately in the x-z plane. The fastening means thus has to be inserted approximately in the y-direction. Thus, expensive special tools would be necessary in any case in order to insert the fastening means with the engine hood closed.

In all the exemplary embodiments described above, the aligning means and the fastening means are configured as separate components, in each case a through-hole being assigned thereto. However, a variant is also possible which provides only one element, wherein the vehicle trim part to be aligned and fixed has a through-hole in a fastening point, wherein said fastening point is movable in a latching manner between a plurality of positions relative to an aligning means. By means of the aligning means which is aligned and latched in the through-hole, the fastening point is subsequently fixed in the reference position.

Figure 5:
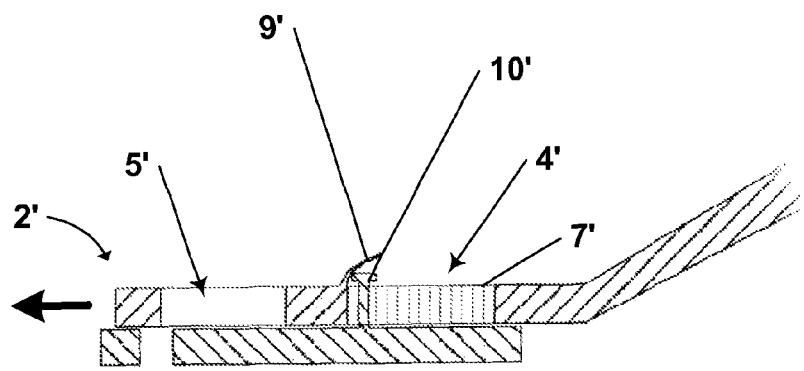
FIG. 5 illustrates a sectional view of the fastening point in accordance with FIG. 4 in a first mounting step when attaching the fastening point to an aligning means.
Figure 6:
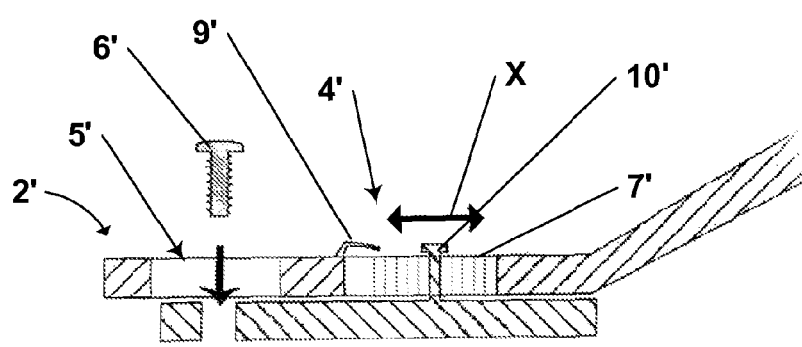
FIG. 6 illustrates a section through the fastening point in accordance with FIG. 4 in a further mounting step after the adjustment of the fastening point relative to the aligning means.

A preferred implementation of a method in accordance with the invention for mounting an attachment part and trim part is explained hereinafter with reference to FIGS. 4 to 6. The method may, for example, be used when mounting a radiator grille on a crossmember fixed to the bodywork. The details in FIGS. 4 to 6 represent the situation in the region of the attachment point 11' on the vehicle bodywork. In a typical mounting situation, the detail illustrated in FIGS. 4 to 6 is located in a region of the engine compartment to the rear of the radiator grille, not illustrated. As a result, the factory worker works from the right-hand side.

In a first mounting step, in accordance with FIG. 4, the factory worker moves the radiator grille 1' relative to the vehicle into a position in which the opening 8' of the through-hole 4' at the fastening point 2' is aligned with an aligning means 10' protruding from the attachment point 11'. As a result, the fastening point 2' as indicated by the arrow is pushed in the manner of a tab over the aligning means 10', into a latched arrangement with limited mobility. In this connection, in accordance with FIG. 5, the resilient tongue of the locking means 9' is pushed upward through the top of the aligning means 10'. Due to the resilience of the locking means 9' only a small amount of force is required to this end.

From this position, the factory worker pushes the radiator grille 1' in the direction indicated by the arrow in FIG. 5 slightly into the engine compartment, whereby the aligning means 10' is displaced into the region of the elongate opening 7' of the through-hole 4'. As the top of the aligning means 10' is slightly wider than the width of the elongate opening, the fastening point 2' in this position is no longer able to slip off the aligning means.

Additionally, due to the displacement in accordance with FIG. 6, the locking means 9' has sprung back into its original position. The tip of the locking means 9' striking against the top of the aligning means 10' prevents the radiator grille 1' from inadvertently moving back into the previous position. It is now not possible for the radiator grille to fall out of the mounting on the motor vehicle. The factory worker is now able to use his full attention to align the radiator grille. To this end, the factory worker successively pulls or pushes the radiator grille on the fastening points 2' out of the engine compartment and/or into the engine compartment, until the join appears uniform. The latched clamping of the aligning means 10' in the elongate opening 7' requires minimum force for displacement and only permits discrete positions. This assists the factory worker when aligning a fastening point 2' to avoid an inadvertent displacement of a further fastening point which is already aligned. Additionally, the factory worker is able to release the radiator grille after the alignment, without the risk of losing the located position. The latching predetermined by the internal contour of the elongate openings 7' is dimensioned such that for changing from one position to another a considerably greater force is required than that generated by the inherent weight of the radiator grille.

At this point of the assembly, the factory worker is able to open the engine hood in order to fix the radiator grille finally and permanently in the aligned position by additional fastening means 6'. To this end, in the component fixed to the vehicle in the region of the attachment point 11' a through-bore is provided with an internal thread, into which a fastening screw 6' is inserted. The fastening screw also extends through the slot 5' on the fastening point 2' and presses said fastening point flat onto the attachment point 11' on the vehicle bodywork. Naturally all suitable elements known to the person skilled in the art may be used as fastening means. For example, a rivet is also included therein.

It may be seen from the figures that the factory worker is able to release the radiator grille when mounting in a specifically located alignment without the risk of inadvertent displacement. As a result, an alignment with a closed engine hood is possible even when said engine hood has to be opened due to the accessibility of the attachment points 11' for using the fastening means 6'.

What is claimed is:

1. An attachment for a vehicle, comprising:
a plurality of fastening points each provided with through-holes configured to receive an alignment device, the fastening points being configured for movement in a pre-mounted position in a latching manner between a plurality of predetermined positions relative to the alignment device in a manner which permits an adjustment of the attachment relative to an attachment point on the vehicle,
wherein the positions are predetermined by an internal contour of the through-holes, and the through-holes have a form of a linear or curved elongated opening with a wave-shaped or toothed inner face on one side or both sides.

2. The attachment of claim 1, wherein the through-holes are also configured to provide a plurality of positions which positively retain the alignment device, an extension thereof being possible by a resilient deformation of the fastening points due to a predetermined force in a direction of displacement.

3. The attachment of claim 1, wherein the through-holes comprise a row of overlapping round bores.

4. The attachment of claim 1, wherein the through-holes include a wide portion and a narrow portion, the wide portion having a diameter which is greater than the diameter of the narrow portion and which permits penetration of a top part of the alignment device.

5. The attachment of claim 4, wherein each of the through-holes is assigned a locking device which counteracts a displacement of the alignment device from a position engaging a respective through-hole in the portion having the enlarged diameter.

6. The attachment of claim 5, wherein the locking device is configured as a resilient tongue which extends on an upper face of a respective fastening point over the portion having the enlarged diameter.

7. The attachment of claim 1, wherein the fastening points are each provided with elongated slots configured to receive a second alignment device fastening means and, in particular, screws or rivets.

8. The attachment of claim 7, wherein:
the alignment device comprises welded bolts, screws or rivets; and
the second alignment device comprises screws or rivets.

9. The attachment of claim 1, wherein the attachment comprises a radiator cover, a radiator grille or a radiator front panel for a motor vehicle.

10. A radiator grille for a motor vehicle, comprising:
a radiator grille body;
an extension arm pivotably fastened to the radiator grille body, the extension arm having a fastening point provided with through-holes configured to receive an alignment device, the fastening point being configured for movement in a pre-mounted position in a latching manner between a plurality of predetermined positions relative to the alignment device in a manner which permits adjustment of the attachment relative to an attachment point on the motor vehicle,
wherein the positions are predetermined by an internal contour of the through-holes, and the through-holes have a form of a linear or curved elongated opening with a wave-shaped or toothed inner face on one side or both sides.

11. The radiator grill of claim 10, wherein the extension arm is pivotably fastened to an upper edge of the radiator grille body.

12. The radiator grill of claim 10, wherein the extension arm is pivotably fastened to and protrudes from an upper edge of the radiator grille body.

13. The radiator grill of claim 10, wherein the through-holes are also configured to provide a plurality of positions which positively retain the alignment device, an extension thereof being possible by a resilient deformation of the fastening point due to a predetermined force in a direction of displacement.

14. The radiator grill of claim 10, wherein the through-holes comprise a row of overlapping round bores.

15. The radiator grill of claim 10, wherein the through-holes include a wide portion and a narrow portion, the wide portion having a diameter which is greater than the diameter of the narrow portion and which permits penetration of a top part of the alignment device.

16. The radiator grill of claim 15, wherein each of the through-holes is assigned a locking device which counteracts a displacement of the alignment device from a position engaging a respective through-hole in the portion having the enlarged diameter.

17. The radiator grill of claim 16, wherein the locking device is configured as a resilient tongue which extends on an upper face of a respective fastening point over the portion having the enlarged diameter.

18. A method for mounting an attachment to a vehicle, comprising:
providing a plurality of fastening points each provided with through-holes,
attaching a vehicle trim at one of the through holes of the plurality of fastening points to a first alignment device of the vehicle in a latched arrangement with limited mobility;
aligning the vehicle trim between a plurality of predetermined latched positions; and
fixing the vehicle trim by a second alignment device in a region adjacent to the fastening points,
wherein the fastening points are configured for movement in a pre-mounted position in a latching manner between the plurality of predetermined positions relative to the first and second alignment devices in a manner which permits an adjustment of the attachment relative to an attachment point on the vehicle, wherein the predetermined positions are predetermined by an internal contour of the through-holes, and the through-holes have a form of a linear or curved elongated opening with a wave-shaped or toothed inner face on one side or both sides.

* * * * *